Jan. 3, 1956  D. M. ROBINSON  2,729,748
APPARATUS FOR STERILIZING FOODS, DRUGS AND
OTHER SUBSTANCES BY SCANNING ACTION OF
HIGH-ENERGY ELECTRONS
Original Filed Aug. 17, 1950  4 Sheets-Sheet 3
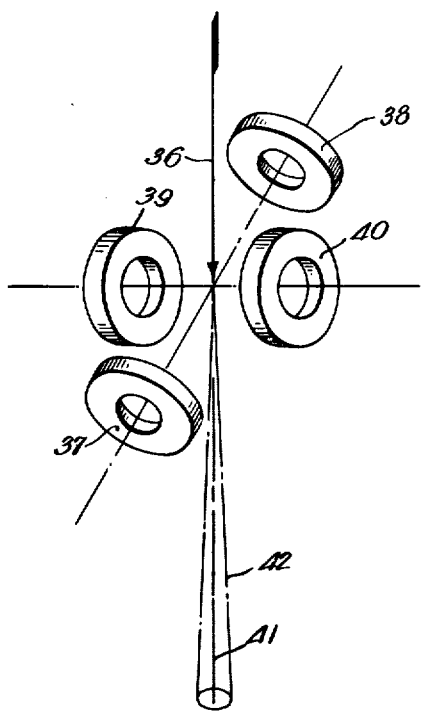
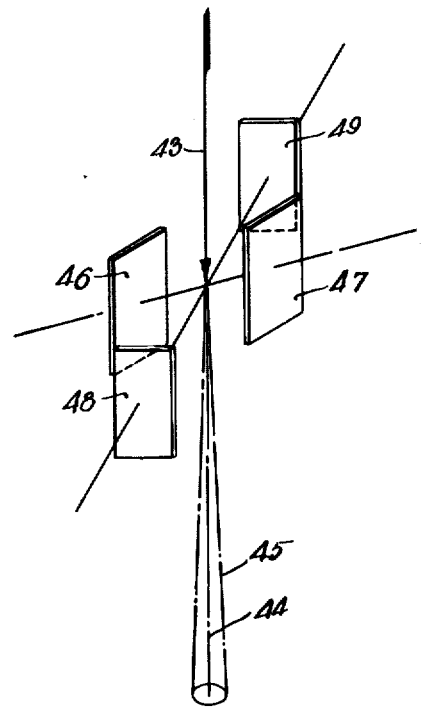
INVENTOR.
Denis M. Robinson
BY
Emery, Booth, Townsend,
Miller & Widner
Atty.

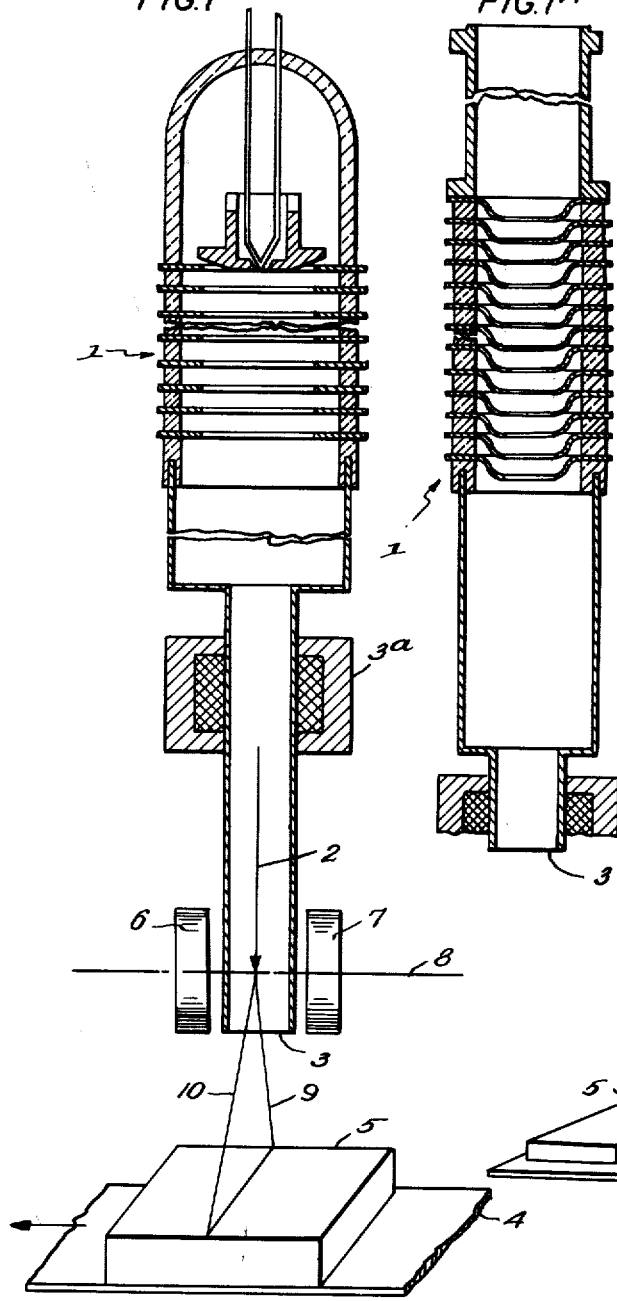
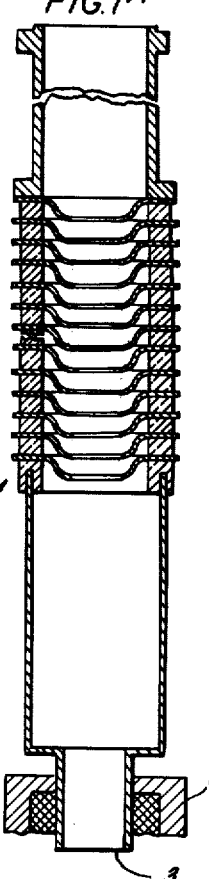
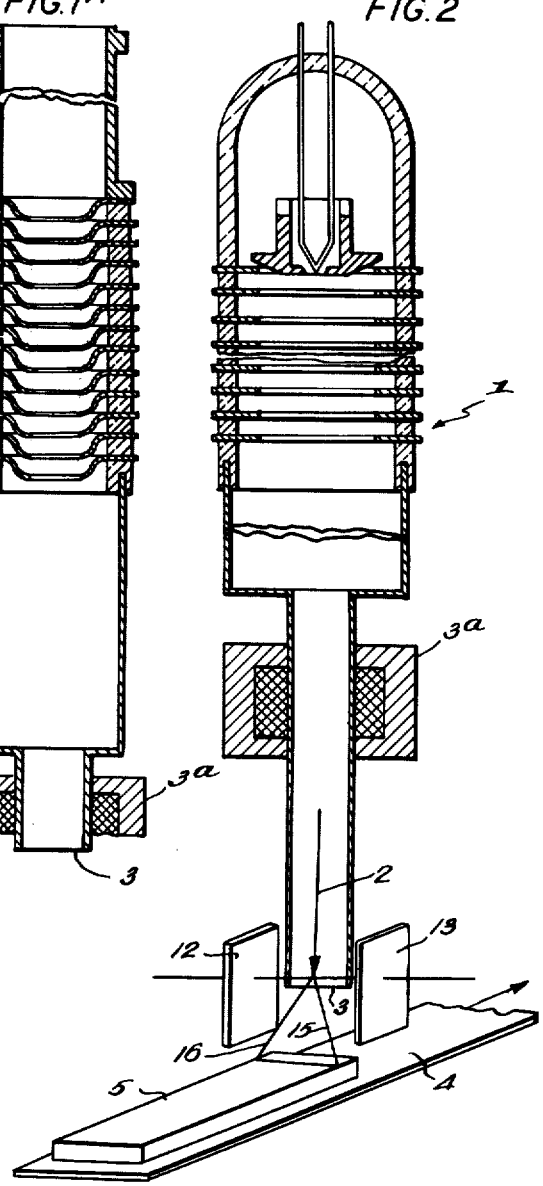

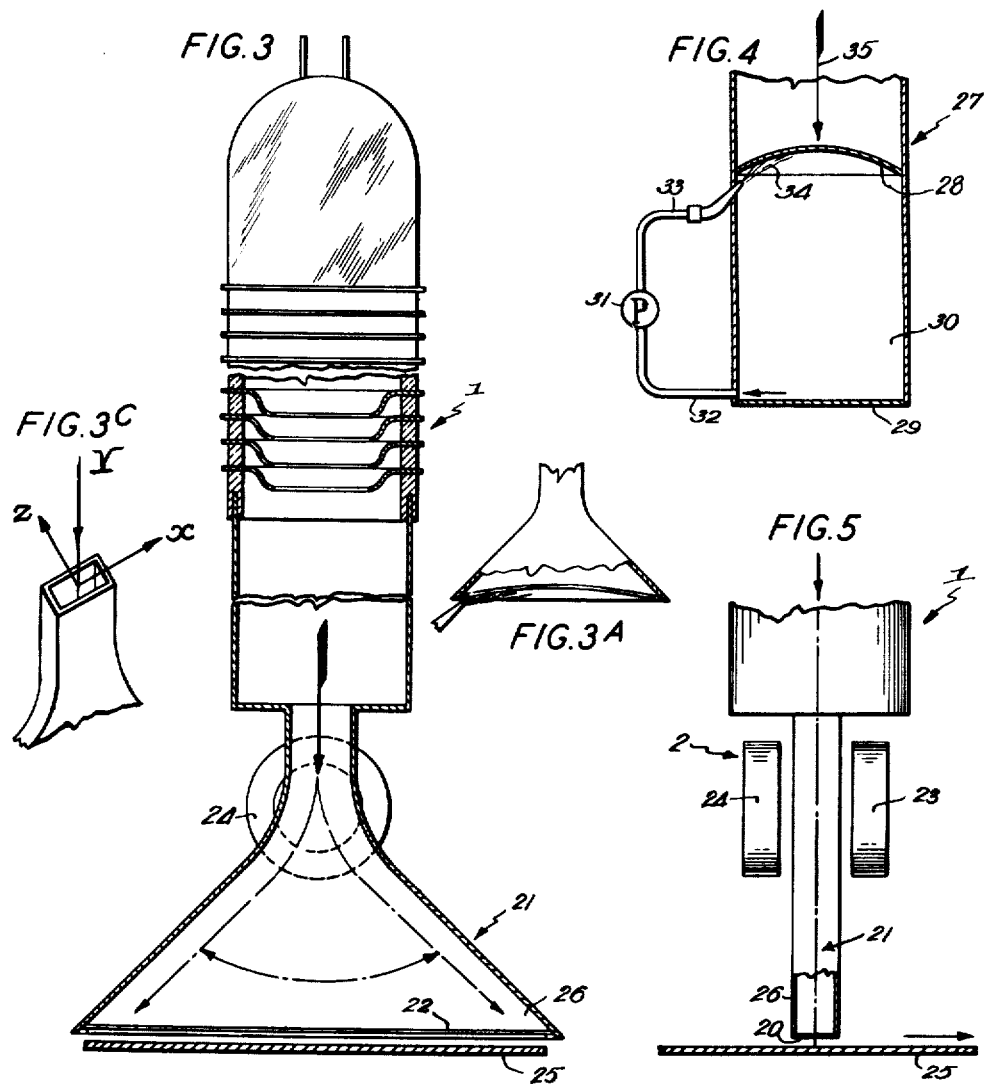
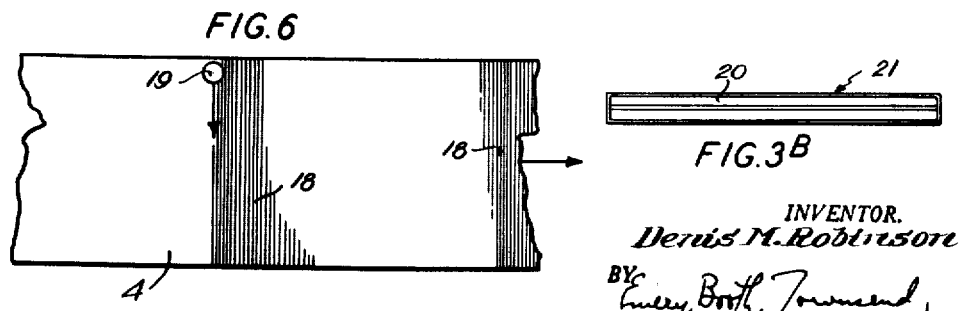

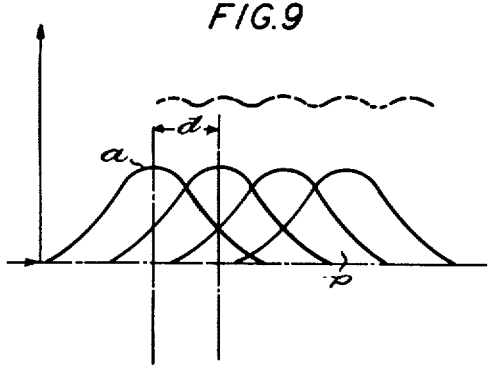
FIG.9
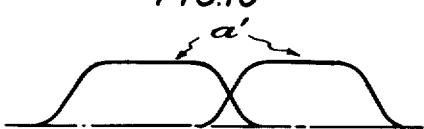
FIG.10
FIG.11
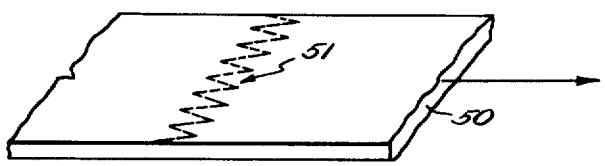
FIG.12
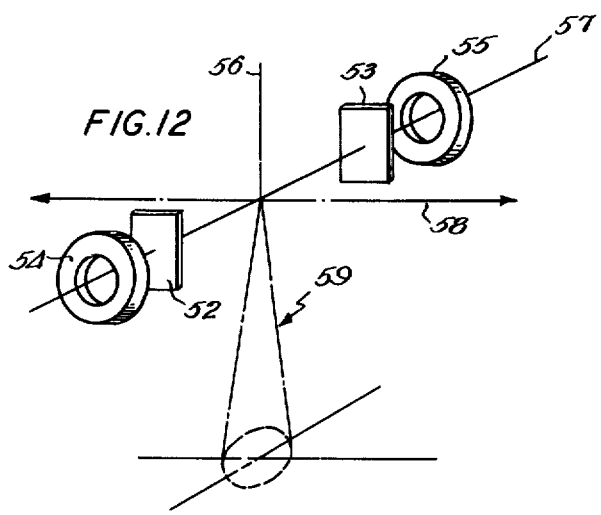

United States Patent Office 2,729,748
Patented Jan. 3, 1956

2,729,748

APPARATUS FOR STERILIZING FOODS, DRUGS AND OTHER SUBSTANCES BY SCANNING ACTION OF HIGH-ENERGY ELECTRONS

Denis M. Robinson, Arlington, Mass., assignor to High Voltage Engineering Corporation, Cambridge, Mass., a corporation of Massachusetts Original application August 17, 1950, Serial No. 179,910, now Patent No. 2,602,751, dated July 8, 1952. Divided and this application July 13, 1951, Serial No. 236,652

15 Claims. (Cl. 250—49.5)

This application is a division of my co-pending application, Serial No. 179,910, filed August 17, 1950, now Patent No. 2,602,751, dated July 8, 1952.

This invention relates to apparatus for sterilizing foods, drugs and other materials or substances, or causing desirable chemical changes in material by ionizing radiations. More particularly it relates to the irradiation with resulting sterilization of such materials by the action of an electron beam of extremely high energy in such manner as rapidly to scan such materials with a high intensity beam so as to increase the instantaneous ionization density, and thereby reduce possible adverse effect on the taste, color, nutritive value, potency or other required properties of such materials. Still more particularly and specifically stated, the invention relates to means for controlling, modifying or varying, by a scanning movement, the sterilizing action of an electron beam of small cross-sectional area and high charge density, by causing it to sweep rapidly, thereby delivering the required total dosage with maximum instantaneous ionization density, but at the same time retaining in the foods, drugs or other materials, desirable characteristics of taste, color, nutritive value and potency. The dose is given in a relatively short time and at a great intensity to a given point on the material being sterilized. The scanning action, I now believe to be in general the best way in which a continuous beam of electrons can be used on solid material to give the necessary great intensity for short times.

Retention of the said properties or characteristics of taste, color, nutritive value and potency while producing the necessary sterilization is the crux of the present invention. The result thereof is that by using an electron beam producing extremely high, instantaneous, ionization density at each and every part of the material, I reduce the extent of chemical changes that may lead to change of taste or of nutritive or of medicinal qualities.

In a co-pending application, belonging to the same assignee as does the present application, is disclosed means for and method of sterilizing foods, drugs and other substances and materials by a beam of high-energy electrons issuing from an acceleration tube of a high-voltage electrostatic generator, such, for example, as the Van de Graaff electrostatic generator manufactured by High Voltage Engineering Corporation, of Cambridge, Massachusetts, the assignee also of this application and invention. Therein is disclosed means for varying the normal relation of the axis of the beam of high-energy electrons with respect to the position of the mass of the substance or material subjected to the action of such beam of high-energy electrons, for the purpose of more nearly equalizing the sterilizing action of such beam of high-energy electrons or, in other words, of increasing the percentage or portion of the sterilizing action of said beam upon all parts of the substance or material while the same is being subjected to such sterilizing action.

The present invention utilizes and is applicable to any concentrated high-energy stream of electrons. Therefore, while I have in the drawings illustrated (though more or less diagrammatically) certain forms of parts of the Van de Graaff high-voltage electrostatic generator, and have briefly described the same, my invention is in no wise limited to the use thereof in practicing my invention. The scanning apparatus herein disclosed, which involves what may be termed a sweeping movement, is used with advantage wherever the high-energy electron beams can be maintained in a small cross section, as for example a one-inch diameter or less. The described scanning action is particularly advantageous when the electron beam is very small in cross section (for example, one-quarter inch, one-eighth inch, or less in diameter). Moreover, the electron beam that I employ in the practice of my invention need not be available continuously in time; that is, the beam may be on for only every positive cycle of an alternating wave form, and the scanning action is accordingly used during such positive cycles only. I do not herein disclose the application of a scanning action or movement in apparatus in which an electron beam is available only in short pulses lasting, for instance, a portion of a milli-second.

The invention herein disclosed is most appropriately practiced with technique involving high-voltage direct-current from steady high-voltage direct-current sources and not with impulses or surges.

Moreover, the scanning action may be applied by an electrostatic or magnetic field before the high intensity beam issues through the window of the acceleration tube, in which case the window is much elongated in the direction of travel of said high-intensity electron beam in its scanning action. Such a window constitutes or is formed as a long narrow slot covered by thin aluminum foil, and provision is made as herein disclosed for carrying away the heat generated by the passage of the electron beam through the window. This is effected more readily than if the same electron beam were continuously passing, with resultant intense heating through the same small window area, instead of being moved back and forth along such narrow slot. The feature of applying the scanning action before the high intensity electron beam issues through the window of the acceleration tube, irrespective of the shape and material of the window and of the type of acceleration tube, and the shape of the lower end portion of the acceleration tube, is broadly claimed herein, as well as the provision of means for cooling the elongated window.

I believe that an extremely intense ionization at a given point and at a given instant of time results in more effective sterilization. The results of my invention are accomplished by producing intense ionization by continuous electron beams which are made possible as a result of the Van de Graaff-High Voltage Engineering Corporation technique.

I have stated that the objective in the sterilization of foods and drugs is to inactivate certain organisms without, however, producing undesirable changes of taste or changes in nutritive or medicinal qualities. This, I have ascertained, is best achieved when the lowest possible ionic effects result from the application of the required sterilization dose.

Furthermore, my investigations show that when subjecting the materials and the referred-to substances to the sterilizing action of an electron beam of extreme intensity, in accordance with my invention, many changes in taste or nutritive or medicinal qualities may be prevented. Not only may changes in taste and potency actually be reduced, but the irradiation dose requirements are at the same time actually reduced, on some, at least, of the organisms present in the material and substances subjected to the sterilization action of an electron beam of extreme intensity.

Having thus set forth the objects of my invention and the general nature thereof, I will now disclose certain embodiments of means or apparatus by which I may practice my invention.

In the accompanying drawings:

Fig. 1 is a diagram, mainly in longitudinal section, illustrating the modification or change in position of the axis of an electron beam of extreme intensity after issuing as an approximately parallel beam from the lower end of the acceleration tube of one form of a Van de Graaff electrostatic generator somewhat diagrammatically shown, such modification or change in position of the axis of the beam occurring at extreme speed, as, for example, by oscillating such beam at a speed of one thousand times a second or less, or more, by the action of alternating current electromagnets—that is, with the scanning occurring parallel to the plane of the said electromagnet coils, the said electron beam being focused or given the desired convergence within the acceleration tube by a surrounding electromagnet as shown, the use of a magnetic lens, as indicated, being feasible only with direct current and not in general with pulsed or impulse voltage wave forms;

Fig. 1A is a vertical section of the present type of Van de Graaff acceleration tube as manufactured by High Voltage Engineering Corporation;

Fig. 2 is a diagram similar to Fig. 1, illustrating a similar modification or change in position of the axis of an electron beam of extreme intensity, by the action of parallel electrode plates standing in, or nearly in, the plane of the drawing paper and having alternating-current high-voltage impressed across them, the scanning action being at right angles to the plane surface of the said electrode plates;

Fig. 3 is a view partly in side elevation and partly in vertical central section of a late type of Van de Graaff acceleration tube built by High Voltage Engineering Corporation, but having connected to it by flanges or otherwise a widely flaring or flared lower end to provide space wherein the scanning action of a field occurs through the action of a pair of alternating current electromagnets, before the electron beam issues through the window, which therefore is greatly elongated in the direction of the scanning movement of the electron beam;

Fig. 3A is a diagrammatic detail in side elevation and vertical section of the lower portion of an acceleration tube of any desired type, but having a flaring or flared lower end terminating in an elongated narrow window and representing cooling means for such window;

Fig. 3B is a bottom plan view of the elongated narrow window represented in Fig. 3;

Fig. 3C is a diagram to indicate certain coordinates concerned with the apparatus of Fig. 3;

Fig. 4 is a diagrammatic view of the lower end of an acceleration tube of any type, provided with means to cool a window near the lower end thereof;

Fig. 5 is a side elevation, but partly in vertical section, of the lower end of the form of acceleration tube shown in Fig. 3;

Fig. 6 is a diagram to illustrate the scanning or sweeping movement of an electron beam across the conveyor belt, and the direction of travel of the said belt carrying the food, drugs, or other materials, not shown thereon;

Fig. 7 is a diagrammatic view illustrating or indicating the scanning or sweeping action of the electron beam as effected not only from side-to-side of the conveyor belt, but also in a direction at right angles—that is, in the direction or forward movement of the conveyor belt, through the action of two sets of alternating-current electromagnetic coils mutually at right angles to each other;

Fig. 8 is a diagrammatic view similar to Fig. 6 but representing the scanning movement effected in the said two directions at right angles to each other, as produced by the action of two sets of parallel plates or electrodes providing two alternating current signals of independent frequency and magnitude;

Fig. 9 is a diagram representing the distribution of electron radiation, measured at the product surface across the section of the electron beam;

Fig. 10 is a diagram indicating the deflection of the beam along the direction of product motion and also across the product (that is, transverse to the direction of product motion);

Fig. 11 is a diagram representing the locus of the beam center at the product surface; and Fig. 12 schematically represents a combination of electrostatic and electromagnetic deflecting fields so oriented that the respective deflecting forces are mutually perpendicular.

Referring more particularly to the drawings, and first to Figs. 1 and 2 thereof, a small portion, broken away, of one form or type of the acceleration tube of a Van de Graaff electrostatic generator, but to the use of which my invention is not limited, is indicated at 1. The said generator is capable of producing a narrow beam of high speed electrons, the energy whereof is or may be on the order of several million volts and as much as five million or more volts, and is manufactured by High Voltage Engineering Corporation. A later form of acceleration tube of a Van de Graaff electrostatic generator built by said High Voltage Engineering Corporation, is shown in Fig. 1A and will be hereinafter referred to more specifically although the action so far as the present invention is concerned is essentially the same.

The high speed electron beam emanating from the cathode of the acceleration tube 1 is indicated at 2. The electrons of the beam 2 are accelerated through the vacuum region of the acceleration tube 1 in a manner not necessary to explain herein in detail, and in the construction shown in Figs. 1, 1A and 2 they travel in a straight line or path and issue through the window 3 at the lower end thereof, having been focused by the focusing magnet indicated at 3A in Figs. 1 and 2.

Still referring to Figs. 1 and 2, at the proper distance below the window 3 of the acceleration tube 1 is provided a suitable support 4 which may be stationary or which, as is here the case, may be a conveyor such as a belt that is driven at a suitable speed forward, transversely to the direction of the axis of the electron beam 2. This motion is indicated as being to the left in Fig. 1, but to the right in Fig. 2, as indicated by the respective arrows. While the said support 4 may be positioned at any suitable distance below the window 3 (in the constructions shown in Figs. 1 and 2), I represent it as positioned at a distance of fifteen to forty centimeters therefrom, but as an electron beam scatters somewhat while passing through air, I may reduce the length of the air path as much as possible, so that the material or product is almost in contact with the window 3.

I am aware that scattering always occurs in the window of an acceleration tube through which the electrons emerge. There is also scattering in any air path or gas path through which the electrons must pass on their way to the product on the conveyor belt or other support, and finally there will be very considerable scattering in the product itself. All of this is primarily elastic nuclear scattering. The laboratory of Dr. Robert J. Van de Graaff (types of whose acceleration tubes are diagrammatically illustrated herein) has done, I believe, more than any other laboratory, respecting the physical processes involved in the scattering and energy loss of electrons in the voltage range to which I have referred.

The scattering in a gas is proportional to the square of the atomic number. Thus hydrogen or helium would scatter very much less than air and would be a preferred gas between the windows in Fig. 4, yet to be described.

The present invention and other related inventions assigned to High Voltage Engineering Corporation are based upon fundamental work done by the scientific group associated with the said High Voltage Engineering Corporation.

Certain problems pertaining to electron scattering and bearing upon the invention herein disclosed are or will be dealt with in other co-pending applications rather than in this application.

When the scanning action is above the window of the electron tube, as in Fig. 3 yet to be described, the product is below and close to the window, as will be more specifically referred to herein.

The product, material or substance to be sterilized is represented at 5, but because of space limitations is merely diagrammatically shown.

In accordance with my invention, I provide means for scanning, moving to and fro, or sweeping the electron beam 2 at an extremely high speed, as for example, at a speed of 1,000 oscillations per second, and even more in certain cases. A high scanning frequency is necessary in order that uniformity of irradiation, particularly in the regions of the product near the surface, may be achieved. This scanning, moving to and fro or sweeping of the electron beam may be effected in any suitable or satisfactory manner, and I have shown two different means for the purpose and certain modifications thereof. In Fig. 1, I have indicated for the purpose the creation of a magnetic field directed at right angles to the direction of propagation of the electron beam 2. This will cause the deflection of the electron beam 2 in a direction at right angles both to the normal path of the electron beam 2 and to the direction of the magnetic field, with an amplitude of oscillation depending upon the energy of the electrons and the intensity of the magnetic field. It may be small or may be fifty degrees, sixty degrees or even ninety degrees. My invention is not limited to any particular amplitude of scanning or like movement.

In the construction shown in Fig. 1, there are provided two alternating-current magnetic coils or magnets 6, 7. The axis of the alternating-current magnetic field is indicated by the line 8. The extent of spread, sweep or scanning movement of the electron beam 2 is indicated by two lines 9, 10. In both Figs. 1 and 2 the angle of scan is represented as about fifty degrees. The electron beam 2 is scanned in a direction parallel to the plane of said magnetic coils 6, 7.

The magnetic field is created by an alternating current passing through the said magnetic coils 6, 7. The electron beam will oscillate; that is, it will be given its scanning movements about its normal beam position with a frequency which is that of the oscillating current, and with an amplitude of oscillation depending upon the strength of the magnetic field, which may be varied as desired. The location of the magnetic coils or magnets 6, 7 is shown merely diagrammatically and in action they give the desired deflection of the electron beam 2. Any extent of angular displacement of the electron beam 2 in the vicinity of the magnetic field will cause a lateral movement of the center of the electron beam on the product 5, the magnitude of which depends, as stated, upon the strength of the magnetic field and also on the distance of the product 5 on the support 4 from the magnetic field. One or more magnetic coils may be used to accomplish the desired purpose.

Referring to Fig. 2, the acceleration tube 1, the electron beam 2 and the window 3 of said tube, the support 4 and the product 5 are represented as in Fig. 1. The electron beam 2 is diagrammatically represented in Fig. 2 as similarly deflected by an alternating electrostatic field at right angles to the direction of propagation of the said electron beam 2. For this purpose I have in Fig. 2 represented a pair of parallel conducting plates 12, 13 well insulated from each other, on which an alternating high voltage is impressed, or they may be suitably shaped and positioned electrodes. As in the case of the magnetic deflection, indicated in Fig. 1, the amplitude of the displacement of the electron beam center depends upon the magnitude of the alternating high voltage and on the distance of the product 5 from the electrostatic field, and I may suitably vary the amplitude of displacement of the electron beam center within the scope of my invention. The axis of the alternating current electric field in Fig. 2 is indicated by the line 14, the extent of spread or sweep or scanning movement of the electron beam being indicated as about fifty degrees by two inclined lines 15, 16.

Summarizing with respect to Figs. 1 and 2, Fig. 1 indicates diagrammatically the spread of the electron beam axis in the case of the application of an alternating-current magnetic field, and Fig. 2 indicates the spread of the electron beam through the action of parallel plates with alternating-current high-voltage impressed across them.

In Fig. 1A I have represented at 1 a late type of acceleration tube of the Van de Graaff type manufactured by High Voltage Engineering Corporation, which type may be and desirably is used in the practice of my invention. It is not herein shown in said Fig. 1A as having an anode at the lower end thereof. It is to be understood that when using the type of acceleration tube shown in Fig. 1A, the anode is replaced by a window which may be similar to the window 3 in Figs. 1 and 2 and is in Fig. 1A so indicated, or it may be of the elongated, narrow or slot-like type which is disclosed in other figures herein and yet to be specifically referred to.

Within the scope of my invention the frequency of oscillation of the electron beam of very great intensity may be suitably varied in accordance with the particular requirements of each case. The character of the oscillations may be also varied. For example, they may be saw-tooth in form, or the oscillations may be in any complex path of circles, arcs, or zigzags.

According to one representative example, there may be a frequency of sixty per second, producing 120 sweeps of the high energy electron beam per second. The beam sweep distance may be assumed in this example to be fifteen centimeters. The irradiation time for each portion of the product can be obtained as follows:

$$\text{Linear scanning speed} = 15 \times 120 \frac{\text{cm.}}{\text{sec.}} = 1.80 \times 10^3 \frac{\text{cm.}}{\text{sec.}}$$

Time spent by the beam in traversing one "spot length," assuming the "spot length" equals 1 cm $= \frac{1}{1.8 \times 10^3} \frac{\text{sec.}}{\text{cm.}} =$ approximately $\frac{1}{2} \times 10^{-3}$ sec.

With respect to the term "spot length," and referring for the purpose to Fig. 6 of the drawings (before particularly describing Fig. 3 and other figures), I have, in describing Figs. 1 and 2, referred to the support 4 as a conveyor, such as a belt, that is driven at a suitable speed forward transversely to the direction of the axis of the electron beam 2.

In Fig. 6 the conveyor is represented as a belt 4 which is carrying the product forward in the direction of the arrow thereon. The scanning or sweeping action is effected from side to side across such belt 4, as indicated by the cross lines 18 thereon. The electron beam from the acceleration tube 1, or other acceleration tube employed, intercepts the surface of the material being sterilized in a small circle indicated at 19, whose dimension in the direction of scanning motion or movement I term the "spot length," and whose dimension in the direction of motion of the belt 4 and the material thereon, I term the "spot width." Frequently these two dimensions will be the same but not necessarily always.

In using the term "spot length" I mean, as stated, the length of the minute spot or area in the direction of the scanning movement, on the upper surface of the treated product, substance or material that, in the very brief time indicated, is penetrated by the electron beam. If the "spot length" were only one-half centimeter, the time spent by the electron beam using a sixty cycle alternating field would be $\frac{1}{4} \times 10^{-3}$ seconds instead of $\frac{1}{2} \times 10^{-3}$ seconds, in the example given in the closely preceding tabulation.

In using 1,000 cycles per second frequency, as I may in accordance with my invention, the time spent by the electron beam in traversing a "spot length" of one centimeter on the treated product will be on the order of $10^{-4}$–$10^{-5}$ seconds. As stated, I may use a somewhat higher scanning frequency.

In the practice of my invention I choose a sweep frequency across the product-carrying belt in such relation to the "spot width" that as the product moves forward every portion of it is supplied with electrons.

Referring further to the scanning action, and as already herein indicated, it need not be strictly oscillatory or alternating. For example, it is possible for the electron beam to scan only in one direction as, say, from left to right across the belt or other conveyor, and to be switched off by some other mechanism during the time when the said deflection means for the electron beam is returning to its starting point and, as stated, the electron beam may traverse the substance or material in any complex path.

I consider the basic essentials of the present invention to be (1) to deliver the required total dosage with maximum instantaneous ionization density, and (2) to produce this required dosage successively in all parts of the material by a scanning action.

In Fig. 3, and in side elevation in Fig. 5, is represented at 20 the lower end portion of a late type or model of acceleration tube of a Van de Graaff electrostatic generator and which acceleration tube may be otherwise similar to that shown in Figs. 1 and 2, or in Fig. 1A, excepting that the lower end of said acceleration tube 20 is shown as markedly outwardly flared or flaring at 21 to left and to right in said Fig. 3 (that is, in two opposite directions) so as in one direction to be in cross section of greatly elongated length as indicated, but the width of which flaring portion is about the same as the normal diameter of said acceleration tube above the flaring portion, or it may be less. The said flaring portion 21 terminates at its extreme lower end in a window 22, which is a long narrow slot and is covered by a thin aluminum foil. Such window must support atmospheric pressure on the outside with vacuum on the inside. The narrowness of the slot and the support given by the closely spaced long sides of the frame insure this.

The length of the said window 22 is preferably such that I may impart to the electron beam within said flaring portion 21 a scanning or sweeping motion extending through fifty degrees or more, and if desired as much as ninety degrees. For that purpose I employ magnetic coils 23, 24, such as shown at 6, 7 in Fig. 1, or I may employ parallel conducting plates, such as shown at 12, 13, in Fig. 2, or other suitably shaped electrodes, and I preferably make said magnetic coils or conducting plates small enough to position them suitably within the flaring portion 21. This gives close coupling with the electron beam and accordingly reduces the scanning power required. Also the material of the vacuum wall thus serves as a shield against stray external fields.

However, I may, as shown in Figs. 3 and 5, provide the magnetic deflection by placing magnetic coils and/or iron cores 23, 24, or parallel conducting plates, entirely outside the vacuum chamber of the acceleration tube.

In Fig. 3C, showing only the upper end of the flaring portion 21, the three arrows X, Y, Z diverge from a point to show the usual three mutually perpendicular coordinates. The electron beam is to be focused by the herein previously disclosed means in a thin line along the Z axis, and having a very small dimension in the X axis. The electron beam moves along the Y axis and thus across the direction of the magnetic field which is provided along the Z axis, and the "spot" (referred to with respect to Fig. 6) will be deflected or scanned back and forth along the X axis. It is merely necessary that the magnetic field exist over a sufficient area of the acceleration tube extension; that is, the part thereof which is below the cylindrical wall composed of the metallic electrode disks and insulation rings. Preferably the side walls constituting the flaring lower end of the acceleration tube are made of some non-magnetic material (for example, aluminum) and the pole faces of the iron cores are brought as close as possible to the two opposing faces of the flaring lower end 21 of the acceleration tube 1. In order to reduce eddy current loss in the side walls of the said flaring lower end portion of the acceleration tube 1, the section or portion of the acceleration tube subject to the magnetic flux may be made of some plastic material so attached as to be vacuum-tight. So long as the electron beam is passing through the magnetic field, the deflection of the electron beam from its original direction continues to increase. After emerging from that field the electron beam continues in a straight path which is a prolongation of its path at the point of leaving the magnetic field. In order to obtain the desired effect without large coils or iron cores, I prefer to have a relatively weak magnetic system and, therefore, I allow the electron beam a path-length within the magnetic field sufficient to produce the required deflection. With such arrangement it is perfectly possible to have an angle of scan of fifty degrees or even ninety degrees within the flaring end portion 21 of the acceleration tube 1.

In the just described construction or arrangement the conveyor belt, indicated at 25 and in said Figs. 3 and 5, is positioned close below the window 22 which is at the extreme lower edge of the said flaring portion 21.

By causing the scanning action to take place within the said flaring lower end portion 21 of the acceleration tube, it is effected therefore before any scattering has taken place, and therefore the electron beam is thus acted upon while the electron optics are still rigid. It is pertinent here to point out that the electron optics of the Van de Graaff type of acceleration tube constant-potential accelerators are very favorable and indeed compare in kind with the precision of the electron microscope.

As already set forth, the scanning action may be applied before the electron beam issues through the window 22 of the acceleration tube, as illustrated in Figs. 3, 3B and 5. In such case the window 22 must be long in the direction of scanning movement of the electron beam, and it therefore is a long narrow slot covered by a thin aluminum foil. Such a window is advantageous also, as already indicated, in that it carries away the heat generated by the passage of the electron beam through it, more readily than if the electron beam were continuously passing through the same small area. The flow of a generated heat can be further increased by having the frame of the window 22 made of material of good heat conductivity, or it may be liquid cooled. The narrowness of the slot-like window 22 and the support given by the closely spaced long sides of the frame at the extreme lower flaring end 21 of the acceleration tube 1 will assure that the window will support atmospheric pressure on the outside with a vacuum inside.

In addition, and whether the window has the shape of a long slot as set forth with respect to Figs. 3, 3B, and 5, or whether it be substantially circular in cross section as may be the case in the construction shown in Figs. 1, 1A and 2, I may and desirably do provide means, other than the shape or structure of the window and its frame, for cooling the window, as by scouring the atmospheric surface thereof with a blast of gas or with fine sprays of liquid or solid materials.

In Figs. 3A and 4, I have represented one means for the purpose, Fig. 4 showing such means applied to the lower end of an acceleration tube, the entire tube being of circular or substantially circular cross section, and Fig. 3A showing the same or similar means applied to the lower flaring end of the acceleration tube shaped as illustrated in Figs. 3 and 5.

In both Figs. 3A and 4 the lower end portion of an acceleration tube of a Van de Graaff or other type is diagrammatically indicated at 27.

Referring to Fig. 4, at a suitable distance above the extreme lower end of the acceleration tube 27 is provided an aluminum window 28 and at the extreme lower end of the said tube 27 is provided a very thin window 29, preferably thin aluminum foil, as for the previously described windows 3 and 22. The space between the two windows 28, 29 is filled preferably with helium gas at atmospheric pressure. Supported suitably outside the acceleration tube 27 is a pump 31 connected at its intake side by a pipe 32 with the helium chamber 30 and at its output side also connected with the said helium chamber by a pipe 33 terminating in a jet-forming orifice 34 by which the helium gas is forcibly discharged by the pump 31 against the lower surface of the aluminum window 28. The gas can be cooled by suitable cooling coils or heat interchanger before being discharged against the window.

While I have herein disclosed a scanning action as occurring within the lower end portion of an acceleration tube and have represented the said lower end portion of the tube as very considerably flaring as at 21, so as to permit an amplitude of scanning of fifty or sixty or even ninety degrees, it is to be understood that so far as I am aware, I am the first to scan a high-energy electron beam within an acceleration tube. If the lower end portion of the acceleration tube be not flared, the amplitude of the scanning movement will, of course, be less, and I prefer to form or shape the acceleration tube so as to permit a large amplitude of scanning movement. My invention is not, however, restricted in this respect.

The scanning action, whether imparted to the electron beam within the acceleration tube or beyond the exit end thereof, or partly within and partly beyond the exit end of the tube, is herein broadly claimed, and the character of the scan may be varied as herein before set forth.

As present I believe that it is not, in general, possible to obtain a cathode-ray or electron beam whose electron density is uniform across such beam. Therefore and in accordance with my invention and the purposes thereof, I cause successive scans to overlay to a sufficient extent to achieve uniform ionization, particularly in those regions or portions of the product near the surface thereof. This overlap of successive scans is effected by suitable control of the scanning means, of whatever character employed.

It will be understood that when I provide an overlap of successive scans, the product is irradiated, not by a substantially instantaneous dose of cathode-rays or electrons, but by a series of such doses time-spaced.

As already explained herein, my invention includes scanning in a direction along the line of motion of the product positioned upon a traveling support, such as a belt conveyor. By creating or effecting a scanning field in a direction along the line of motion of the so supported product, I am enabled to condense the time interval during which these incremental doses are applied. Therefore, the frequency of scanning along the line of the product motion can be much higher, since the amplitude necessary to produce the equivalent of a uniform electron beam is in general much less than that required to scan the width of the product.

As already stated herein, the scanning frequency may be somewhat higher than 1,000 per second. A high frequency is necessary in order that uniformity of irradiation may be achieved.

When large scanning angles are employed by me, as herein disclosed, penetration of the radiation is proportional to the cosine of the scanning angle. It is, therefore, necessary that either the product depth be varied accordingly or that the rate of deflection of the electron beam be varied proportionately with the scanning angle cosine. However, I have discovered that for a uniform product thickness, ionization may not reach the required dose in the portions of the product at the edges of the supporting belt if $$\frac{\text{Product thickness}}{\text{Cosine of maximum angle}}$$

is greater than penetration depth.

In accordance with my invention, I either vary the depth of the product or the rate of deflection of the electron beam in order to obtain compensation combined with efficiency.

In the carrying out of my invention the electrons must be accelerated in a highly evacuated region—on the order of $10^{-4}$ mm. of mercury or better. This is because the mean free path of the high-energy electrons becomes on the order of the dimensions of the acceleration tube at pressures greater than $10^{-4}$ mm. of mercury. It necessarily follows that the materials to be irradiated must not be located in that region, because all such materials may give off gases and vapors, either naturally or under electron bombardment, which would spoil the vacuum in the acceleration tube. Therefore, the open volume in which the product is located must be separated from the open volume in which the electrons are accelerated by a constriction or diaphragm which generally comprises an electron-permeable exit window, but which could also comprise apparatus such as that disclosed in the patent to Ernest A. Burrill 2,640,948, and which patent is the property of High Voltage Engineering Corporation of Cambridge, Massachusetts, to which this present invention has been assigned.

The invention herein disclosed has usefulness for and includes uses other than for sterilization. That is, the disclosed invention is advantageous in effecting the required transformation in a chemical process with a minimum of undesirable side effect. Thus, the herein described invention comprehends and includes means for increasing the desired yield in a chemical process by using electron beams of high energy and intensity to scan material very rapidly so as to increase the instantaneous ionization density. The present invention also comprehends and includes means for irradiating a material in which it is required to produce a chemical change by a direct ionization action, and wherein it is, at the same time, desired to keep to a minimum undesirable secondary or side chemical processes or actions produced by indirect action of ionization. Such means includes therefore irradiating the material with an electron beam of small cross sectional area and high-charge density, and causing such electron beam to sweep rapidly, thereby delivering the required total dosage with maximum instantaneous ionization density. This is all within the scope of the disclosed invention.

The scanning movement of the electron beam may be effected not only in a path transverse to the path of forward movement of the belt conveyor (that is, crosswise of the said belt conveyor as described with respect to Figs. 1, 2, 3, 5 and 6) but also in the direction of forward movement of the said belt conveyor (namely, in a direction at right angles to what may be referred to as the main scan). The purpose of providing two sets of scanning movements is to produce any required movement of the electron beam in the direction of the movement of the product, in order that the material to be acted upon by the electron beam may be completely and efficiently scanned.

In Fig. 7, I have represented for the purpose of imparting two scanning movements to the electron beam 36 at right angles or at any other angle to each other, two sets of alternating magnetic coils 37, 38, 39, 40, mutually at right angles to each other. The electron beam axis is indicated at 41 and the spread thereof at 42. The spread may be greater than indicated in said figure.

In Fig. 8, the electron beam is indicated at 43, the axis of the said beam at 44 and the spread of the said beam at 45. The two sets of parallel plates or electrodes are indicated at 46, 47, 48 and 49. Here also the spread may be greater than indicated in this figure.

By utilizing two sets of alternating magnetic coils mutually at right angles to each other, or two sets of parallel plates or electrodes, two alternating current signals of independent frequency and magnitude are employed for the purpose of producing an electron beam of any desired pattern in cross section as, for example, an ellipse or a rectangle, or indeed any other geometric figure.

In the diagram Fig. 9, the curve $a$ represents the distribution of electron radiation, measured at the product surface, across the section of the electron beam. Between successive scans or scanning movements the product will have moved a distance $d$, so that the total irradiation at the product surface is obtained by summing a series of curves identical with the curve $a$, and each displaced by the distance $d$. The degree of overlap is determined by the scanning frequency and by the product velocity, one or both of which may be varied to achieve any desired degree of uniformity. It will be seen that a point on the product corresponding to the point $p$ of Fig. 9 will receive three substantially instantaneous increments of irradiation. The number of increments received in any given case will depend on the degree of overlap. Although the curve $a$ is representative only, the statements respecting the diagram, Fig. 9, are applicable to any practically obtained distribution.

If the electron beam be deflected along the direction of product motion as well as across it, the effective distribution will be made as indicated in Fig. 10, wherein the curve $a'$ represents the distribution of electron radiation, measured at the product surface.

In Fig. 11 the belt conveyor is indicated at 50, it moving in the direction of the arrow. The locus of the beam center is indicated at 51. The overlap of the electron beam at the product surface, when the electron beam is deflected along the direction of product motion and also across it, will occur mainly between successive scans or scanning movements along the direction of product motion, and the time and number of substantially instantaneous increments of irradiation delivered to a point on the product surface is controlled by the scan frequency.

I have described as means for effecting the scanning movement of the electron beam either (a) the creation of a magnetic field directed at right angles to the direction of propagation of the electron beam, by the employment of two alternating-current magnetic coils or magnets 6, 7, or (b) the action of an alternating electrostatic field at right angles to the direction of propagation of the electron beam, this being effected by a pair of parallel conducting plates 12, 13 on which an alternating high voltage is impressed.

I may also employ for effecting the scanning movement herein described a combination of electrostatic and electromagnetic deflecting fields so oriented that the respective deflecting forces are mutually perpendicular. Such a combination is represented in Fig. 12, wherein I have represented a pair of parallel conducting plates 52, 53, and a pair of magnet coils or magnets 54, 55. The axis of the electron beam is indicated at 56, the electric field axis at 57, the magnetic field deflection force at 58, and the resultant pattern locus at the electron beam axis at 59.

Having thus disclosed several illustrative embodiments of apparatus for practicing my invention, it is to be understood that although specific terms are employed, they are used in a generic and descriptive sense, and not for purposes of limitation, the scope of the invention being set forth in the following claims.

I claim:

1. Apparatus for irradiating foods, drugs and other materials with high-energy electrons comprising in combination means for creating and directing an electron beam of small, cross-sectional area and high charge density, means for preserving the necessary vacuum in which the electrons are accelerated, means for supporting in the path of such electron beam, and outside the evacuated region in which the electrons are accelerated, the material to be irradiated by the action of said electron beam, and means for causing said electron beam to sweep rapidly with relation to said supported material, thereby delivering onto said supported material, by said electron beam, the required total dosage with maximum instantaneous ionization density.

2. Apparatus for irradiating foods, drugs and other materials with high-energy electrons comprising in combination, means for creating and directing a concentrated beam of high-energy electrons, means for preserving the necessary vacuum in which the electrons are accelerated, means for supporting in the path of such electron beam, and outside the evacuated region in which the electrons are accelerated, the material to be irradiated by the action of said electron beam, and means to impart a scanning movement to said electron beam with relation to such supported material simultaneously in two paths which are at an angle to each other.

3. Apparatus for irradiating foods, drugs and other materials with high-energy electrons comprising in combination, means for creating and directing a concentrated beam of high-energy electrons, means for preserving the necessary vacuum in which the electrons are accelerated, means for supporting in the path of such electron beam, and outside the evacuated region in which the electrons are accelerated, the material to be irradiated by the action of said electron beam, and means to impart a scanning movement to said electron beam with relation to such supported material simultaneously in two directions which are substantially at right angles to each other.

4. Apparatus for irradiating foods, drugs and other materials with high-energy electrons comprising in combination, means for creating and directing a beam of high-energy electrons, a conveyor for supporting the material while being irradiated, means to impart onward traveling movement to said conveyor, and means to impart, with respect to the material upon said conveyor, movement to said electron beam transversely of the path of travel of said conveyor.

5. Apparatus for irradiating foods, drugs and other materials with high-energy electrons comprising in combination, means for creating and directing a beam of high-energy electrons, a conveyor for supporting the material while being irradiated, means to impart onward traveling movement to said conveyor, and means to impart, with respect to the material upon said conveyor, movement to said electron beam transversely of the path of travel of said conveyor, and also in the direction of forward movement of said conveyor.

6. Apparatus for irradiating foods, drugs and other materials with high-energy electrons, comprising in combination, an acceleration tube having at one end portion cathode means for creating a beam of high-energy electrons from which the beam is discharged lengthwise said tube, said tube terminating at its opposite end in a flared portion ending in an elongated, narrow, exit window, and means for imparting a scanning movement to said electron beam within said flared portion in a path substantially coinciding with the longer axis of said exit window, for discharge through said window in such scanning path.

7. Apparatus for irradiating foods, drugs and other materials with high-energy electrons, comprising in combination, an acceleration tube having at one end portion cathode means for creating a beam of high-energy electrons from which the beam is discharged lengthwise said tube, said tube terminating at its opposite end in a flared portion ending in an elongated, narrow, exit window and alternating current means for imparting a scanning movement to said electron beam within said flared portion in a path substantially coinciding with the longer axis of said exit window, for discharge through said window in such scanning path.

8. Apparatus for irradiating foods, drugs and other materials with high-energy electrons, comprising in combination, an acceleration tube having at one end portion cathode means for creating a beam of high-energy electrons from which the beam is discharged lengthwise said tube, said tube terminating at its opposite end in a flared portion ending in an elongated, narrow, exit window, and alternating current electromagnets at the opposite faces of said flared portion for imparting a scanning movement to said electron beam within said flared portion in a path substantially coinciding with the longer axis of said exit window, for discharge through said window in such scanning path.

9. Apparatus for irradiating foods, drugs and other materials with high-energy electrons comprising in combination, means for creating and directing a beam of high-energy electrons, means for supporting in the path of such electron beam the material to be irradiated by the action of said electron beam, and means positioned in proximity to the path of said electron beam and between the area of origin of said electron beam and the supported material, and electrostatic means to act thereon, to impart an extremely rapid movement of oscillation to said electron beam with respect to said supported material.

10. Apparatus for irradiating foods, drugs and other materials with high-energy electrons comprising in combination, an acceleration tube having at one end portion cathode means for creating a beam of high-energy electrons from which the beam is discharged lengthwise said tube, said tube terminating at its opposite end in a flared portion ending in an elongated, narrow, exit window, and means within the vacuum of the said acceleration tube for imparting a scanning movement to said electron beam within the said flared portion in a path substantially coinciding with the longer axis of the said exit window for discharge through said window in such scanning path.

11. An apparatus in accordance with claim 10, wherein the said means within the vacuum of the acceleration tube to impart the scanning movement is composed of electromagnetic scanning coils.

12. An apparatus in accordance with claim 10, wherein the said means within the vacuum of the acceleration tube to impart the scanning movement is composed of electromagnetic scanning coils located in said flared portion of said tube.

13. Apparatus for irradiating foods, drugs, and other materials, and thereby sterilizing the same, including means to create a concentrated accelerated electron beam of high energy and to deliver the total dosage of such electron beam in a relatively short time and at a great intensity, to a given point on such material being sterilized, means to preserve the necessary vacuum in which the electrons are accelerated, means for supporting in the path of said concentrated accelerated electron beam, and outside the evacuated region in which the electrons are accelerated, the materials to be irradiated by the action of said beam for subsequent use or consumption, and means including a combined electromagnetic system and an electrostatic system, for imparting to the said electron beam a rapid scanning movement with respect to such material.

14. Apparatus for irradiating foods, drugs, and other materials, and thereby sterilizing the same, including means to create a concentrated accelerated electron beam of high energy and to deliver the total dosage of such electron beam in a relatively short time and at a great intensity, to a given point on such material being sterilized, means to preserve the necessary vacuum in which the electrons are accelerated, means for supporting in the path of said concentrated accelerated electron beam, and outside the evacuated region in which the electrons are accelerated, the materials to be irradiated by the action of said beam for subsequent use or consumption, and means including an electrostatic system for imparting to the said electron beam a rapid scanning movement with respect to such material.

15. Apparatus for irradiating with a continuous beam of high-energy electrons, materials and products wherein it is desired to deliver a required total dosage with maximum instantaneous ionization density, comprising in combination: means for creating and directing a continuous, high-intensity beam of high-energy electrons; means for preserving the necessary vacuum in which the electrons are accelerated better than $10^{-4}$ mm. of mercury; means for supporting in the path of such electron beam, and outside the evacuated region in which the electrons are accelerated, the material or product to be irradiated by the action of said electron beam; and means for imparting a rapid scanning movement to the said beam with relation to the said supported material or product, thereby increasing the instantaneous ionization density of said beam in its action on said material or product.

References Cited in the file of this patent

UNITED STATES PATENTS

| | | |
|---|---|---|
| 1,231,883 | Hanssen | July 3, 1917 |
| 1,781,286 | Kubler et al. | Nov. 11, 1930 |
| 2,162,850 | Lems et al. | June 20, 1939 |
| 2,241,432 | Von Ardenne et al. | May 13, 1941 |
| 2,282,024 | Bitner | May 5, 1942 |
| 2,429,217 | Brasch | Oct. 21, 1947 |
| 2,437,914 | Frondel | Mar. 16, 1948 |
| 2,437,915 | Frondel | Mar. 16, 1948 |
| 2,569,872 | Skehan et al. | Oct. 2, 1951 |

UNITED STATES PATENT OFFICE
Certificate

Patent No. 2,729,748                          Patented January 3, 1956

Denis M. Robinson

The United States District Court for the District of Idaho, Southern Division, having, pursuant to Title 35, Section 256 of the United States Code, ordered that the above identified United States patent be corrected by adding the name of John G. Trump as a joint inventor, it is this 21st day of October 1969 certified that the name of the said John G. Trump is hereby added to the said patent as a joint inventor with the said Denis M. Robinson.

[SEAL]

EDWIN L. REYNOLDS,
*First Assistant Commissioner of Patents.*